C. B. GALVIN.
INSTRUMENT FOR SURVEYING DRILL HOLES.
APPLICATION FILED JULY 16, 1914.
1,187,519.
Patented June 20, 1916.
2 SHEETS—SHEET 2.
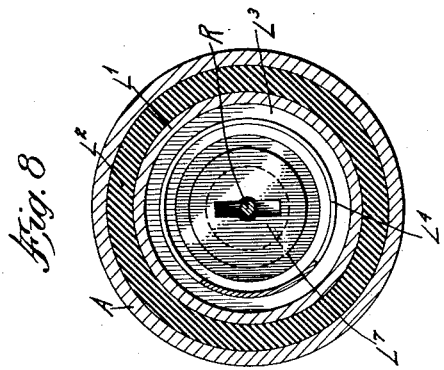
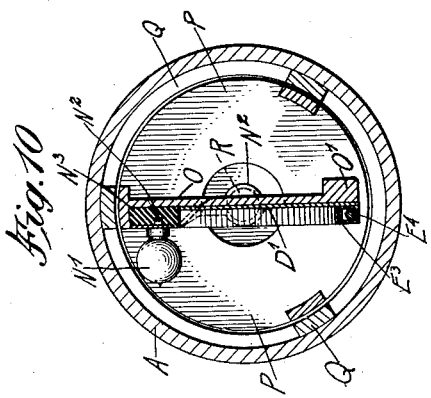
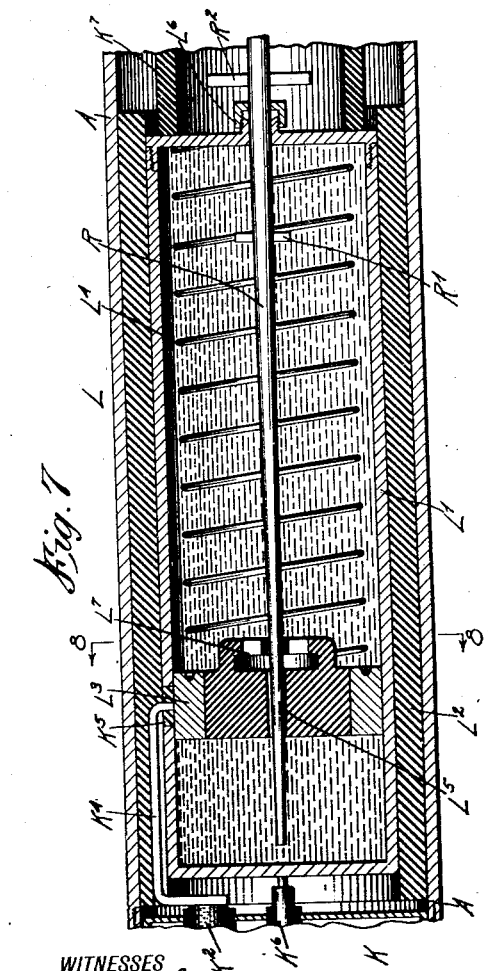
INVENTOR
Charles B. Galvin.
BY Munn & Co
ATTORNEYS

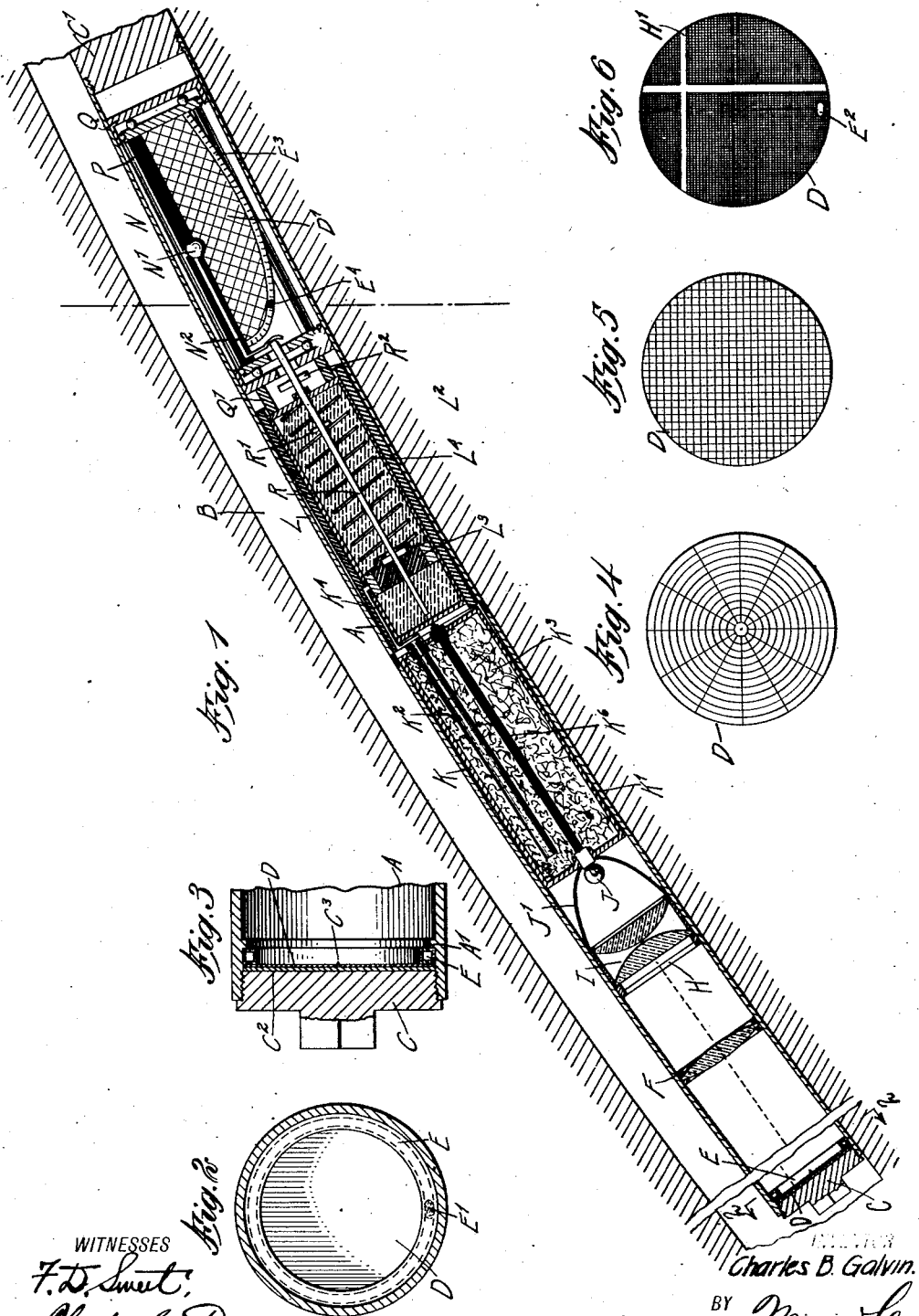

UNITED STATES PATENT OFFICE.

CHARLES BROE GALVIN, OF CORNWALL-ON-THE-HUDSON, NEW YORK.

INSTRUMENT FOR SURVEYING DRILL-HOLES.

1,187,519.   Specification of Letters Patent.   Patented June 20, 1916.

Application filed July 16, 1914. Serial No. 851,373.

*To all whom it may concern:*

Be it known that I, CHARLES B. GALVIN, a citizen of the United States, and a resident of Cornwall-on-the-Hudson, in the county of Orange and State of New York, have invented a new and Improved Instrument for Surveying Drill-Holes, of which the following is a full, clear, and exact description.

The object of the invention is to provide a new and improved instrument more especially designed for surveying drill holes to accurately determine any dip or strike in a long distance test hole, or for tracing the location of buried or concealed pipes.

In order to accomplish the desired result use is made of a flexible carrier adapted to be inserted in the drill hole and to conform to the contour thereof, and means in the said carrier for determining both lateral and vertical deviations of the carrier in any position in the drill hole.

A practical embodiment of the invention is represented in the accompanying drawings forming a part of this specification, in which similar characters of reference indicate corresponding parts in all the views.

Figure 1 is a longitudinal central section of the instrument in position in the curved portion of a drill hole; Fig. 2 is an enlarged cross section of the lower end of the instrument and showing more particularly the circular glass tube containing a drop of mercury and the sensitized film, the section being on the line 2—2 of Fig. 1; Fig. 3 is an enlarged central section of the same; Fig. 4 is a face view of a modified form of sensitized film; Fig. 5 is a similar view of another modified form of the sensitized film; Fig. 6 is a like view of the developed film showing the lateral and vertical deviation of the carrier in the drill hole; Fig. 7 is an enlarged longitudinal central section of the timing device; Fig. 8 is a cross section of the same on the line 8—8 of Fig 7; Fig. 9 is an enlarged longitudinal central section of the photographic means for obtaining the dip or angle of the bore hole relative to a vertical or horizontal plane; and Fig. 10 is a cross section of the same on the line 10—10 of Fig. 9.

The instrument is mounted on a suitably constructed tubular carrier A adapted to be inserted into the drill hole B by suitable means, and the ends of the said carrier A are closed by plugs C and C', of which the upper plug C' is connected with the means for inserting the instrument in the drill hole or removing it therefrom. The lower plug C is provided on its inner face with a backing $C^2$ adapted to support a sensitized film or sheet D of disk form, and which may be provided with concentric and radial lines, as indicated in Fig. 4, or with intersecting lines, as indicated in Fig. 5, to divide the face of the disk into minute squares. The backing $C^2$ is preferably provided with a centrally disposed pin $C^3$ for pricking the film D centrally thus locating the center thereof. On the face of the film D is held a ring E of glass or other suitable diaphanous material and fitting against the interior surface of the carrier A and against an annular shoulder A' thereof, as plainly indicated in Fig. 3. This tube E contains a drop of mercury or other opaque rolling member E', which can be photographically reproduced on the sensitized film D, as hereinafter more fully explained, it being understood that whatever position the instrument may assume in the drill hole B the member E' rolls to the bottom of the ring E and thus assumes a particular relation relative to the film D held in fixed relation to the ring E. In front of the ring E is arranged an objective F extending transversely in the tube A to photograph the member E' on the sensitized film D. In front of the objective F are arranged cross hairs H and in front of the cross hairs H is arranged a condenser I formed of the usual lenses, and in front of which is located a lamp J, preferably in the form of an incandescent electric lamp, provided with a reflector J' to cause the rays of light from this lamp J to pass by way of the condenser I to the objective F for photographing the cross hairs H on the film D as well as the member E' (see Fig. 6). It will be noticed that when the exposure is made the cross hairs are photographically reproduced on the film D, as indicated by the image at H' in Fig. 6, and the rolling member E' is reproduced as an image $E^2$ on the film so that the lateral and vertical displacement of the tube is photographically reproduced.

It is understood that the horizontal distance from the intersection of the cross hairs of the image H' to the diameter passing through the center of the image $E^2$ of the drop of mercury indicates the lateral deviation, while the shortest distance from the intersection of the cross hairs of the image H' indicates the vertical deviation. In other words, the coördinates of the point of intersection are indicated graphically.

In order to supply the electric lamp J with electrical energy, use is made of a battery K located in the carrier A adjacent the lamp J. The battery K consists of a zinc casing K' forming one electrode and a carbon electrode $K^2$ extending through the exciting material $K^3$ with which the casing K' is filled. Next to the battery K is arranged a timing device L. Next to the timing device L is arranged a photographic device N for indicating the dip or angle of the axis of the bore hole B with a horizontal or a vertical plane. The function of the device N is that of a plumb bob or level and forms a check on the record described in Fig. 6. The device N is provided with an electric lamp N' and with a tube $E^3$, of glass or other diaphanous material, and containing a drop of mercury or other opaque rolling member $E^4$, and the said device N is further provided with a sensitized film D' disposed vertically on a holder O supporting both the tube $E^3$ and the electric lamp N', as will be readily understood by reference to Figs. 9 and 10. The holder O is mounted on a skeleton frame P mounted to revolve by the use of ball bearings in an open frame Q inserted in the carrier A and spaced from the timing device L by a ring Q', of hard rubber or other insulating material. The lower end of the holder O is provided with a weight O' so that the holder O hangs vertical at all times and consequently the member $E^4$ rolling in the tube $E^3$ assumes a lowermost position in the curved tube $E^3$ whatever position the latter may take on inserting the instrument in the bore hole B. It will be noticed that when the electric lamp N' is lighted the rolling member $E^4$ is photographed on the film D' thus indicating on this film the vertical deviation of the instrument in the bore hole B. The electric lamp N is provided with a contact plate $N^2$ engaging a member of the timing device L, as hereinafter more fully described, and the said lamp is mounted on an insulated block $N^3$ (see Fig. 10) attached to the holder O, and a contact plate $N^4$ on the said block connects one end of the filament of this lamp N' with the holder O, the other end of the filament being connected with the contact $N^2$, previously mentioned. The electric circuit to the battery is completed by way of the holder O and frames P and Q.

The electric lamp N' as well as the lamp J are lighted at the time the instrument is in position in the bore hole B by the timing device L, which latter is arranged as follows, special reference being had to Figs. 7 and 8. A cylinder L' is surrounded by a tubular covering $L^2$, of rubber or other insulating material, and the cylinder L' is filled with oil, glycerin or other suitable liquid. Within the cylinder L' reciprocates a piston $L^3$, the outer portion of which is of metal while the central portion is of hard rubber or other insulating material. A contact $K^4$ is attached to the outer end of the carbon electrode $K^2$ and extends in the covering $L^2$ and through a block $K^5$ of insulating material inserted in the wall of the cylinder L'. The terminal of the contact $K^4$ is flush with the inner surface of the cylinder L' to make contact with the piston $L^3$ when the latter nears the end of its stroke in the cylinder L', and the piston $L^3$ moves out of engagement with the contact $K^4$ at the time the piston reaches the end of its stroke. An insulating conductor $K^6$ extends through the casing K' to connect at one end with one end of the filament of the electric lamp J and to connect at the other end with the metal casing K' to complete the circuit for the lamp J whenever the piston $L^3$ engages the contact $K^4$. The block $K^5$ is narrower than the piston $L^3$ to insure an electric connection between the contact $K^4$, the piston $L^3$ and the casing K' whenever the piston nears the end of its stroke, as shown in Figs. 1 and 7. It is understood that the electric lamp J is mounted on the casing K' to connect the latter with the other end of the filament of the lamp J.

The piston $L^3$ is pressed on by a spring $L^4$ and the central portion of the piston is provided with an opening $L^5$ to allow the liquid contained in the cylinder L' to pass from one side of the piston $L^3$ to the other side thereof. Through the opening $L^5$ extends a tapering rod R passing through a stuffing box $L^6$ at the forward end of the cylinder L'. On the rod R within the cylinder L' is arranged a pin R' adapted to engage a socket $L^7$ arranged on the forward end of the piston $L^3$ to allow of drawing this piston $L^3$ into forward position with a view to compress the spring $L^4$ and to move the piston $L^3$ out of contact with the contact $K^4$. The outer end of the rod R' is provided with a handle $R^2$ to permit the operator to turn the rod R' with a view to disengage the rod R' from the socket $L^7$ immediately prior to lowering the instrument into the drill hole B. It is understood that when the piston $L^3$ is released by disengaging the pin R' from the socket $L^7$ then the spring $L^4$ forces the piston toward the lower end of the cylinder L'. It is understood that the forward movement of the piston $L^3$ is retarded by the liquid contained in the cylinder L', the said liquid flowing from the lower end of the cylinder L' through the opening $L^5$ into the upper end of the cylinder. By extending the tapering rod R through the opening L⁵ the latter is reduced to a considerable extent so as to cause the piston to travel very slowly in the cylinder L', and the rod R is made tapering so that gradually more space is obtained for the liquid to flow through the opening L⁵ as the latter moves downwardly and the power of the spring L⁴ decreases. When the piston L³ finally reaches the position shown in Fig. 7 then the piston moves into engagement with the contact K⁴ thus closing the circuits of the contacts K², K³ to light the lamps J and N arranged in the said circuit, by the carbon electrode K² being in contact with the cylinder L' and the rod R engaging the plate N² connected with the lamp N'. The piston L³ in its onward travel finally moves out of engagement with the contact K³ to extinguish the lamps to allow of pulling up the instrument without further exposures.

In using the instrument the latter is inserted into the drill hole B, and as the carrier A follows the contour of the drill hole and finally reaches the desired position at which the survey is to be made, the piston L³ will have reached the contact making position so that the electric lamps J and N' are lighted, and in doing so cause the cross hairs H and the member E' to be photographed on the film D and the member E⁴ to be photographed on the film D'. After this has been done, the instrument is removed from the drill hole B and the plug C is unscrewed, the film D removed and developed in the usual manner. In a like manner the plug C' is removed to allow withdrawal of the frames Q and P to permit removal of the film D' from the holder O for developing the said film in the usual manner. It is understood that the operation just described is carried on in a dark room.

The negative obtained by the developing of the film D shows the lateral and vertical deviations of the carrier A in the drill hole B and consequently the lateral and vertical deviations of the drill hole itself, as the carrier assumes the contour of the drill hole at the dip or strike thereof. The negative obtained by the developing of the film D' shows the dip or angle of the axis of the bore hole with the horizontal or vertical planes.

I do not limit myself to the particular construction of the photographic means shown and described or to the timing device as the same may be varied without deviating from the spirit of my invention. Instead of using the photographic device N for obtaining the dip or angle of the axis of the bore hole with the vertical or horizontal, other suitable means may be employed, but for obtaining vertical and lateral deviation I prefer photographic means for accomplishing the result, as above described.

It will be noticed that the several devices can be readily placed in position in the carrier A or removed therefrom whenever it is desired to do so for repairs or other purposes.

Having thus described my invention, I claim as new and desire to secure by Letters Patent:

1. An instrument for surveying drill holes, comprising a carrier adapted to be inserted in the drill hole to follow the contour thereof, a holder on the said carrier and adapted to hold a sensitive film, photographic means mounted in the carrier for photographically determining the deviation of the carrier in the drill hole, a source of light for the said photographic means, and a timing device in the said carrier for controlling the said source of light.

2. An instrument for surveying drill holes, comprising a carrier adapted to be inserted in the drill hole to follow the contour thereof, a holder in the said carrier and adapted to hold a sensitive film, a photographic means in the said carrier, a source of light in the carrier, means for automatically controlling the said source of light, and a member movable in the carrier in front of the sensitive film and having its image projected on the said film by the said means.

3. An instrument for surveying drill holes, comprising a carrier adapted to be inserted in the drill hole to follow the contour thereof, a holder in the said carrier and adapted to hold a sensitive film, a photographic means in the said carrier, a source of light in the carrier, means for automatically controlling the said source of light, and a member movable in the carrier intermediate the film and the photographic means to simultaneously project images of the said movable member and the cross hairs on the said film.

4. An instrument for surveying drill holes, comprising a carrier adapted to be inserted in the drill hole to follow the contour thereof, a holder in the said carrier and adapted to hold a sensitive film, a photographic lens in the carrier, a source of light in the carrier, a movable member in the carrier and having its image projected on the said film by the said lens, and a self-contained timing device in the said carrier and controlling the said source of light.

5. An instrument for surveying drill holes, comprising a carrier adapted to be inserted in the drill hole to follow the contour thereof, a holder in the said carrier and adapted to hold a sensitive film, a member movable in front of the said holder to be photographed, a photographic lens in the carrier, a source of light in the carrier, a movable member in the carrier and having its image projected on the said film by the said lens, cross hairs in the said carrier, a condenser in the said carrier, and a timing device in the said carrier and controlling the said source of light.

6. An instrument for surveying drill holes, comprising a carrier adapted to be inserted in the drill hole, photographic means mounted in the carrier for photographically determining lateral and vertical deviation of the carrier in the drill hole, a second photographic means mounted in the carrier for indicating the dip of the bore hole to a horizontal or vertical plane, the said photographic means having artificial sources of light located in the said carrier, one for each photographic means, and a timing device in the said carrier for controlling the said sources of light.

7. An instrument for surveying drill holes, comprising a carrier adapted to be inserted in the drill hole, photographic means including a source of light mounted in the said carrier for photographically determining the lateral and vertical deviation of the carrier in the drill hole, a second photographic means including a source of light and mounted in the said carrier for photographically indicating the dip of the bore hole to a horizontal or vertical plane, and a timing device in the said carrier for controlling the said sources of light.

8. An instrument for surveying drill holes, comprising a carrier adapted to be inserted in the drill hole, photographic means including a source of light mounted in the said carrier for photographically determining vertical and lateral deviation of the carrier in the drill hole, a second photographic means including a source of light and mounted in the said carrier for photographically determining the angle of the bore hole relative to a vertical or horizontal plane, the said sources of light being in the form of electric lamps, switches for the same and a battery, and a timing device in the said carrier and controlling the said switches to light the lamps at a predetermined time.

9. An instrument for surveying drill holes, comprising a tubular carrier adapted to be inserted in the drill hole, a holder on the said carrier and adapted to hold a sensitive film on its inner face, a diaphanous hollow ring in front of the said film and containing a rolling opaque member, a photographic lens in front of the said ring, and a source of light for the said lens.

10. An instrument for surveying drill holes, comprising a tubular carrier adapted to be inserted in the drill hole, a holder on the said carrier and adapted to hold a sensitive film on its inner face, a diaphanous hollow ring in front of the said film and containing a rolling opaque member, a photographic lens in front of the said ring, a source of light for the said lens, and cross hairs interposed between the said lens and the said source of light to project the said cross hairs on the said film.

11. An instrument for surveying drill holes, comprising a tubular carrier adapted to be inserted in the drill hole, a holder on the said carrier and adapted to hold a sensitive film on its inner face, a diaphanous hollow ring in front of the said film and containing a rolling opaque member, a photographic lens in front of the said ring, a source of light for the said lens, cross hairs interposed between the said lens and the said source of light to project the said cross hairs on the said film, and a timing device for the said source of light.

12. An instrument for surveying drill holes, comprising a tubular carrier, a frame mounted to revolve axially in the said carrier and adapted to support a sensitive film in a vertical plane, a diaphanous tube mounted on the said frame and extending in a vertical plane on one face of the said film, an opaque rolling member in the said diaphanous tube, and a source of light mounted on the said frame to illuminate the said rolling member.

13. An instrument for surveying drill holes, comprising a tubular carrier, a frame mounted to revolve axially in the said carrier, and adapted to support a sensitive film in a vertical plane, a diaphanous tube mounted on the said frame and extending in a vertical plane on one face of the said film, an opaque rolling member in the said diaphanous tube, a source of light mounted on the said frame to illuminate the said rolling member, and a timing device for the said source of light.

14. An instrument for surveying drill holes, comprising a tubular carrier, photographic means in the said tube and having a source of light and a timing device in the carrier for the said source of light, the timing device having a cylinder filled with a liquid, a piston movable in the said cylinder and controlling the said source of light, the piston having an opening for the passage of the liquid from one side of the piston to the other side thereof, and a spring pressing the said piston.

15. An instrument for surveying drill holes, comprising a tubular carrier, photographic means in the said tube and having a source of light and a timing device in the carrier for the said source of light, the timing device having a cylinder filled with a liquid, a piston movable in the said cylinder and controlling the said source of light, the piston having an opening for the passage of the liquid from one side of the piston to the other side thereof, a spring pressing the said piston, and a manually controlled rod having retaining and releasing means for the said piston to hold the latter in inactive position against the tension of its spring until it is desired to release the piston.

16. An instrument for surveying drill holes, comprising a carrier adapted to be inserted into the drill hole, a holder in the said carrier and adapted to hold a sensitive film, a rolling member in front of the film, means for confining the said rolling member, a lens in front of the said means, and a source of light for the said lens.

17. An instrument for surveying drill holes, comprising a carrier adapted to be inserted into the drill hole, a holder on the said carrier and adapted to hold a lined sensitive film, a chamber in front of the said film, a rolling member in the said chamber, a photographic lens in front of the said chamber, and a source of light for the said lens.

In testimony whereof I have signed my name to this specification in the presence of two subscribing witnesses.

CHARLES BROE GALVIN.

Witnesses:
FRANK WORCH,
T. C. JONES, Jr.